United States Patent
Nakamura et al.

(10) Patent No.: US 11,465,503 B2
(45) Date of Patent: Oct. 11, 2022

(54) VEHICLE INTERIOR STRUCTURE

(71) Applicant: MAZDA MOTOR CORPORATION, Hiroshima (JP)

(72) Inventors: Seishi Nakamura, Hiroshima (JP); Tomonori Ohtsubo, Hiroshima (JP); Taro Oike, Hiroshima (JP); Masaki Chiba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 299 days.

(21) Appl. No.: 16/641,624

(22) PCT Filed: Aug. 17, 2018

(86) PCT No.: PCT/JP2018/030553
§ 371 (c)(1),
(2) Date: Feb. 24, 2020

(87) PCT Pub. No.: WO2019/039406
PCT Pub. Date: Feb. 28, 2019

(65) Prior Publication Data
US 2021/0031631 A1  Feb. 4, 2021

(30) Foreign Application Priority Data

Aug. 25, 2017 (JP) .............................. JP2017-162402
Aug. 25, 2017 (JP) .............................. JP2017-162403

(51) Int. Cl.
*B60K 37/02* (2006.01)
*B60J 1/02* (2006.01)
*B60R 13/02* (2006.01)

(52) U.S. Cl.
CPC ................. *B60K 37/02* (2013.01); *B60J 1/02* (2013.01); *B60R 13/0256* (2013.01);
(Continued)

(58) Field of Classification Search
CPC .......... B60K 2370/60; B60K 2370/654; B60K 2370/691; B60K 2370/152; B60K 2370/194; B60K 2370/688
(Continued)

(56) References Cited

U.S. PATENT DOCUMENTS

2015/0243046 A1  8/2015  Yoshida et al.
2018/0266643 A1  9/2018  Koiso

FOREIGN PATENT DOCUMENTS

JP  2004-203130 A  7/2004
JP  2015-180041 A  10/2015
(Continued)

OTHER PUBLICATIONS

International Preliminary Report on Patentability and Written Opinion issued in PCT/JP2018/030553; dated Feb. 25, 2020.
(Continued)

*Primary Examiner* — Dennis H Pedder
(74) *Attorney, Agent, or Firm* — Studebaker & Brackett PC (57) ABSTRACT

Disclosed is an interior structure (1, 100, 200) for a vehicle, which comprises a vehicle interior structural component (12, 114, 216) arranged within a field-of-view of a driver, wherein at least one outline (12a, 114a, 216a) of the vehicle interior structural component is approximately coincident with an axis line (Ab, Af, Ad) oriented toward a vehicle interior of the vehicle, among a plurality of axis lines radially extending from a vanishing point (P) defined when the driver visually views forwardly while being seated in a driver seat.

8 Claims, 5 Drawing Sheets

(52) U.S. Cl.
CPC .. *B60K 2370/152* (2019.05); *B60K 2370/194* (2019.05); *B60K 2370/654* (2019.05); *B60K 2370/688* (2019.05); *B60K 2370/691* (2019.05)

(58) Field of Classification Search
USPC .................................................. 296/70, 146.2
See application file for complete search history.

(56) References Cited

FOREIGN PATENT DOCUMENTS

| | | |
|---|---|---|
| JP | 2015-217860 A | 12/2015 |
| JP | 2016-084019 A | 5/2016 |
| JP | 2016-172526 A | 9/2016 |
| JP | 2017-100525 A | 6/2017 |

OTHER PUBLICATIONS

International Search Report issued in PCT/JP2018/030553; dated Sep. 25, 2018.
"Notice of Reasons for Refusal" Office Action issued in JP 2017-162402; mailed by the Japanese Patent Office dated Sep. 18, 2018.
"Notice of Reasons for Refusal" Office Action issued in JP 2017-162402; mailed by the Japanese Patent Office dated May 13, 2019.
"Notice of Reasons for Refusal" Office Action issued in JP 2017-162403; mailed by the Japanese Patent Office dated Sep. 18, 2018.
"Notice of Reasons for Refusal" Office Action issued in JP 2017-162403; mailed by the Japanese Patent Office dated May 13, 2019.

VEHICLE INTERIOR STRUCTURE

TECHNICAL FIELD

The present invention relates to an interior structure for a vehicle, or a vehicle interior structure.

BACKGROUND ART

A window frame structure of an automotive vehicle is described in JP 2015-217860A (Patent Document 1). In this window frame structure, a virtual edge of a front windshield is displayed on the front windshield such that it extends in an upward-downward direction along the vicinity of a front pillar in a manner visible to a driver. This virtual edge is formed such that it is gradually spaced apart from the front pillar in a direction from a lower end toward an upper end of the front pillar. When the virtual edge is displayed in this manner, the driver feels that an optical flow extending from a vanishing point is vanished at the virtual edge, so that it is possible to ensure the same visual state as that under a hypothetical condition that the front pillar is in a state close to upright. This makes it possible to improve a vehicle speed feeling to be felt by a driver.

CITATION LIST

[Patent Document]
Patent Document: JP 2015-217860A

SUMMARY OF INVENTION

Technical Problem

In the invention described in the Patent Document 1, a vehicle speed feeling to be felt by a driver is improved by displaying the virtual edge of the front windshield along the vicinity of the front pillar. As above, information to be acquired by a driver who drives a vehicle is not simply based on an external landscape recognized through a front window and the like, but is also influenced by a vehicle interior structural component which comes into driver's field-of-view together with the external landscape. Therefore, information about an external environment sensible by the driver becomes different depending on a vehicle interior structural component which comes into driver's field-of-view. That is, depending on a vehicle interior structural component which comes into driver's field-of-view, an error in information acquired by the driver is likely to become large, or wrong information is likely to be recognized by the driver. According to researches of the present inventors, it has been revealed that the shape or the like of a vehicle interior structural component has a strong influence on accuracy with which a driver figures out the position of an own vehicle.

It is therefore an object to provide a vehicle interior stricture capable of allowing a driver to easily and accurately figure out the position of an own vehicle.

Solution to Technical Problem

In order to solve the above problem, the present invention provides an interior structure for a vehicle, which comprises a vehicle interior structural component arranged within a field-of-view of a driver, wherein at least one outline of the vehicle interior structural component is approximately coincident with an axis line oriented toward a vehicle interior of the vehicle, among a plurality of axis lines radially extending from a vanishing point defined when the driver visually views forwardly while being seated in a driver seat.

During driving of a vehicle, there is a situation where a driver unconsciously drives the vehicle to travel along a zone deviated toward one side of a lane or travels in a zigzag pattern in the lane. There is also a situation where, when a driver attempts to park a vehicle along compartment lines in a parking area, the driver fails to park the vehicle parallel to the compartment lines, and has to redo the parking operation many times. It is true that the occurrence of these situations largely depends on a driving technique of a driver. However, through researches of the present invention, it has been found that the occurrence is also influenced by an interior structure of a vehicle being driven by the driver. Specifically, when a driver drives a certain vehicle, the driver can easily drive the vehicle to travel along an appropriate zone in a lane, whereas, when the same driver drives another vehicle, traveling in a deviated zone or in a zigzag pattern in a lane is likely to occur.

On the other hand, when a person is walking on a road, a situation where the person unconsciously walks along a deviated course or in a zigzag pattern generally never occurs. This is probably because, when a person is walking in a space, the person unconsciously cognizes a virtual axis line extending from a distant vanishing point to a ground beneath his/her feet and then cognizes the position of each object existing therearound, on the basis of the axis line, thereby adequately moving his/her body in a direction toward a desired destination.

On the other hand, when a driver is driving a vehicle, a virtual axis line extending from a distant vanishing point is blocked halfway by a lower edge of a front window, so that the driver becomes less likely to imagine an axis line extending to a position beneath his/her feet. Thus, the driver will figure out his/her position in a space where the vehicle travels, while imagining the presence of the axis line extending to the position beneath his/her feet in his/her head. However, depending a vehicle interior structure which comes into the field-of-view of the driver during driving, "axis line sensibility", i.e., sensibility to an axis line to be imagined in driver's head is disturbed, and thereby the axis line to be imagined is likely to deviate from an actual axis line.

In the vehicle interior structure of the present invention having the above feature, at least one outline of the vehicle interior structural component is approximately coincident with an axis line oriented toward a vehicle interior of the vehicle, among a plurality of axis lines radially extending from a vanishing point defined when the driver visually views forwardly while being seated in a driver seat. As a result, the driver can adequately imagine a virtual axis line extending to a position beneath his/her feet, so that it becomes possible for the driver to easily figure out his/her position in a space where the vehicle travels. This makes it possible for the driver to easily drive the vehicle to travel along an appropriate zone in a traveling lane.

Preferably, in the interior structure of the present invention, the at least one outline of the vehicle interior structural component is visually viewed such that it is approximately coincident with the axis line oriented toward the vehicle interior, in a forward field-of-view of the driver seated in the driver seat.

According to this feature, the outline of the vehicle interior structural component is approximately coincident with the axis line oriented from the vanishing point toward the vehicle interior, in the forward field-of-view of the driver seated in the driver seat, so that an axis line imagined by the driver is less likely to deviate from the actual axis line, and thereby the driver can easily drive the vehicle to travel along an appropriate zone in a traveling lane.

Preferably, in the interior structure of the present invention, the vehicle interior structural component is a window frame of a side window, wherein the interior structure is configured such that a lower edge of the window frame is approximately coincident with the axis line oriented from the vanishing point toward the vehicle interior.

According to this feature, the interior structure is configured such that the lower edge of the window frame is approximately coincident with the axis line oriented from the vanishing point toward the vehicle interior, so that the axis line extending from the vanishing point is approximately coincident with the outline of the vehicle interior structural component over a relatively long distance, and thereby it is possible to effectively assist the "axis feeling" of the driver.

Preferably, in the interior structure of the present invention, the vehicle interior structural component is a center display arranged on an instrument panel of the vehicle, wherein the interior structure is configured such that each of opposite lateral edges of the center display is approximately coincident with the axis line oriented from the vanishing point toward the vehicle interior.

According to this feature, the interior structure is configured such that each of the lateral edges of the center display is approximately coincident with the axis line oriented from the vanishing point toward the vehicle interior, so that an outline assisting the "axis feeling" of the driver can be arranged on the side of a of the vehicle when viewed from the driver, and thereby the driver can obtain a more accurate axis feeling.

Preferably, in the interior structure of the present invention, the vehicle interior structural component is an instrument cluster hood covering an instrument cluster of the vehicle, wherein the interior structure is configured such that a given region of an outer edge of the instrument cluster hood is approximately coincident with the axis line oriented from the vanishing point toward the vehicle interior.

According to this feature, the given region of the outer edge of the instrument cluster hood is approximately coincident with the axis line oriented from the vanishing point toward the vehicle interior, so that the "axis feeling" can be assisted in the vicinity of the center of the field-of-view of the driver to effectively enhance the "axis feeling" of the driver.

Preferably, in the interior structure of the present invention, an upper end of an instrument panel arranged in front of the driver seat to serve as the vehicle interior structural component is provided with a vanishing point mark at a position on the axis line extending to the driver from the vanishing point defined when the driver visually views forwardly while being seated in the driver seat.

According to this feature, the upper end of the instrument panel is provided with the vanishing point mark at a position on the axis line extending to the driver from the vanishing point defined when the driver visually views forwardly, so that the driver can easily recognize the vanishing point. Thus, the driver becomes more likely to direct attention toward an axis line extending from the vanishing point to the driver. This makes it possible for the driver to easily figure out his/her position in a space where the vehicle travels and to easily drive the vehicle to travel along an appropriate zone in a traveling lane.

Preferably, in the above interior structure, the vanishing point mark formed on the upper end of the instrument panel is a protrusion formed on the instrument panel.

According to this feature, the vanishing point mark is composed of a protrusion, so that it impossible to provide the vanishing point mark at a given position without spoiling aesthetic quality of the vehicle interior structure.

Preferably, in the above interior structure, the protrusion formed on the instrument panel is provided at a top of an instrument cluster hood of the instrument panel.

According to this feature, the protrusion is provided at the top of the instrument cluster hood of the instrument panel, so that the protrusion serving as the vanishing point mark is located at an approximately center of the field-of-view of the driver. Thus, the driver is apt to naturally look at the protrusion, so that it is possible for the driver to effectively direct attention toward an axis line extending from the vanishing point.

Preferably, in the above interior structure, the vanishing point mark formed on the upper end of the instrument panel is located above an upper end of a steering wheel of the vehicle when viewed from the driver seated in the driver seat of the vehicle.

According to this feature, the vanishing point mark is located above the upper end of the steering wheel of the vehicle when viewed from the driver seated in the driver seat of the vehicle, so that it is possible to allow the vanishing point mark to always come into the driver's field-of-view together with an external landscape, thereby always prompting the driver to direct attention toward the vanishing point.

Effect of Invention

The vehicle interior stricture of the present invention makes it possible to allow a driver to easily and accurately figure out the position of an own vehicle.

DESCRIPTION OF EMBODIMENTS

With reference to the accompanying drawings, preferred embodiments of the present invention will be described.

Figure 1:
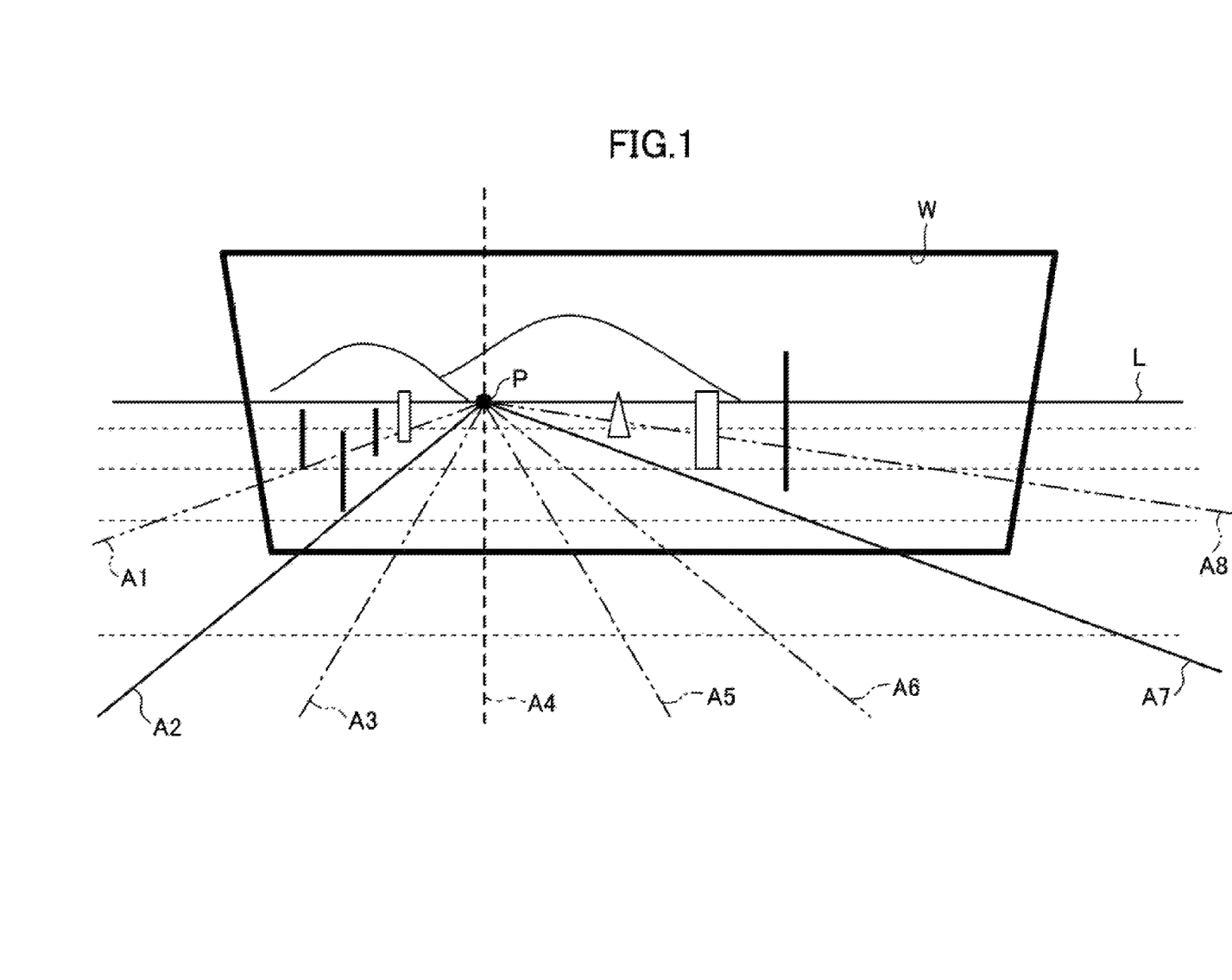
FIG. 1 is a diagram schematically showing an external landscape visually viewed by a driver who drives a vehicle.

FIG. 1 is a diagram schematically showing an external landscape visually viewed by a driver who drives a vehicle.

A driver appropriately takes driving actions, such as steering manipulation, by figuring out the position of an own vehicle in a space where the vehicle travels, while visually viewing an external landscape, as shown in FIG. 1. In this process, the driver figures out the position of the own vehicle in the space while recognizing a distant vanishing point P, and virtual axis lines A1 to A8, etc., extending radially from the vanishing points, in an unconscious manner. Here, the vanishing point P is a point on a distant horizon line L. In a case where the vehicle is traveling in a straight lane having a constant width, as shown in the example illustrated in FIG. 1, the vanishing point P is located at an intersection point of the axis line A2 and the axis line A7 each coincident with a respective one of opposed border lines (edges) of the lane.

However, the virtual axis lines A extending from the vanishing point P are blocked halfway by a window frame W of a front window, before they reach beneath the feet of the driver. Thus, the driver takes driving actions while imagining the victual axis lines extending to the outside of the window frame W. However, the present inventors have found that there is a situation where driver's attention to an axis line extending to the driver from a vanishing point defined when the driver visually views forwardly while being seated in a driver seat decreases. Then, it has been clarified that, by arranging a vanishing point mark on the axis line extending from the vanishing line to the driver, a visual line of the driver is guided to the vanishing point to allow the driver to easily direct attention toward the axis line extending from the vanishing line.

The present inventors have also found that, by allowing an axis line oriented toward a vehicle interior, among a plurality of axis lines extending radially from a vanishing point defined when a driver seated in a driver seat visually views forwardly to be approximately coincident with an outline of a vehicle interior structural component, in a forward field-of-view of the driver, it becomes easier for the driver to imagine an axis line extending to the outside of the window frame W. That is, by allowing the axis line extending from the vanishing point to be approximately coincident with the outline of the vehicle interior structural component, it becomes easier for the driver to obtain the "axis feeling", i.e., the image of an axis line extending from the vanishing point to a position beneath the feet of the driver, and adequately figure out the position of the own vehicle in the space where the vehicle travels.

Figure 2:
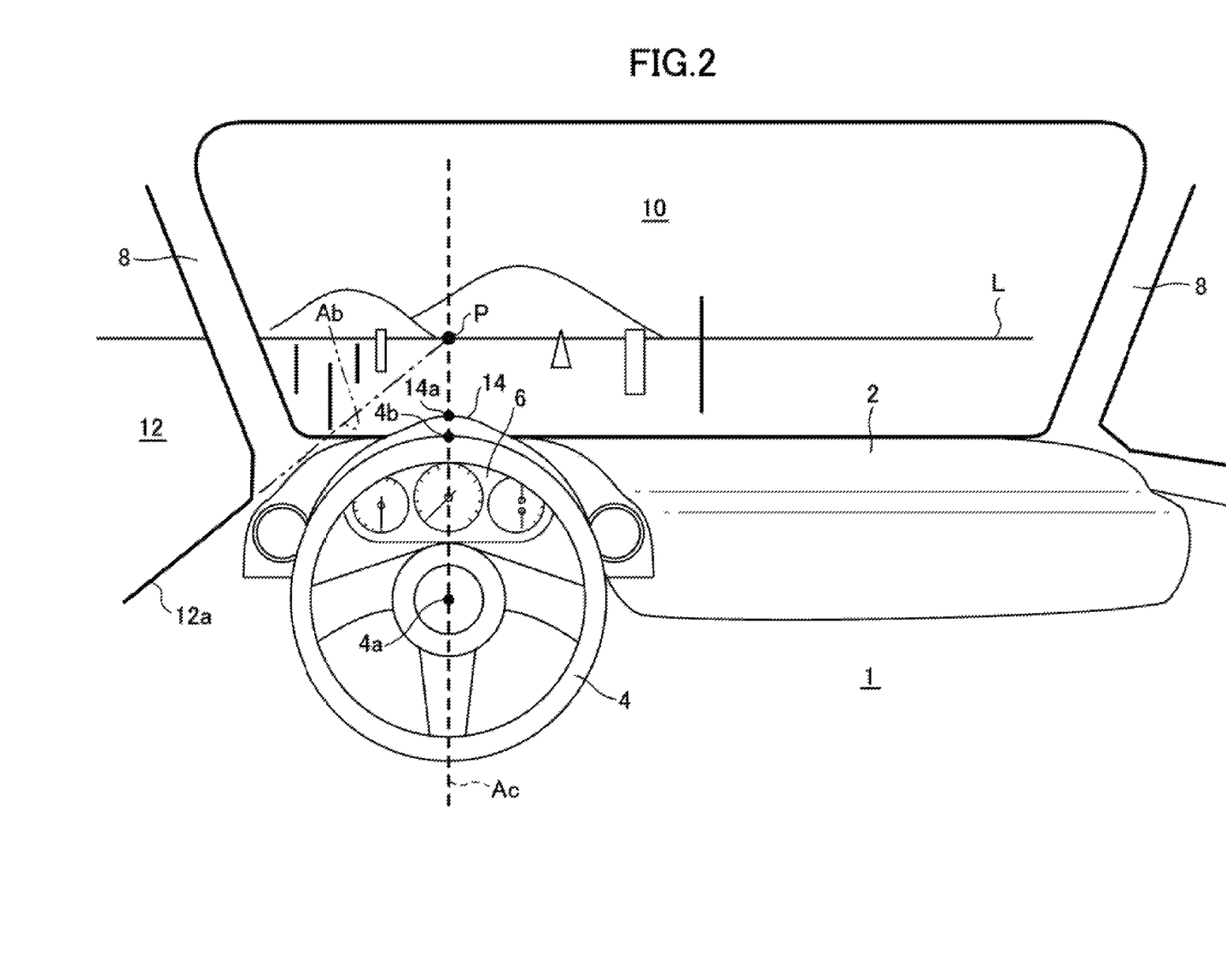
FIG. 2 is a perspective view showing a vehicle interior structure according to a first embodiment of the present invention.
Figure 3:
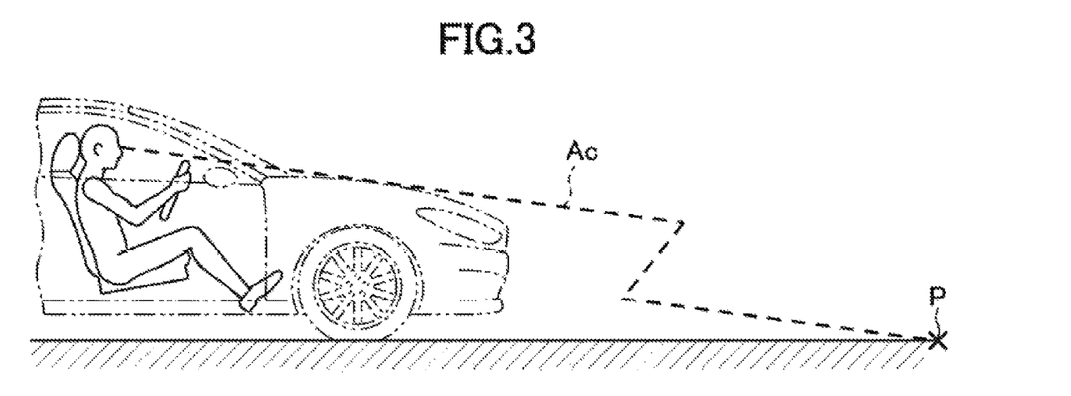
FIG. 3 is a diagram showing a visual line of a driver seated in a driver seat, in the first embodiment.

FIG. 2 a perspective view showing a vehicle interior structure according to a first embodiment of the present invention. FIG. 3 is a diagram showing a visual line of a driver seated in a driver seat.

As shown in FIG. 2, in the vehicle interior structure 1 according to this embodiment, as a vehicle interior structural component, an instrument panel 2, a steering wheel 4, an instrument cluster 6, a front pillar 8, a front window 10, a side window 12, etc., come into the field-of-view of the driver. Here, a region of the instrument panel 2 located just above the instrument cluster 6 is formed as a raised portion which makes up an instrument cluster hood 14.

In this embodiment, the vehicle interior structure 1 is configured such that a lower edge 12a of a window frame of a driver seat-side side window 12 as the vehicle interior structural component is approximately coincident with an axis line Ab oriented from a vanishing point P toward a vehicle interior. More specifically, an inclination of the lower edge 12a of the window frame of the driver seat-side side window 12 through which a driver seated in a driver seat visually views forwardly is approximately coincident with an inclination of the axis line Ab oriented from the vanishing point P toward the vehicle interior. As above, by allowing a so-called "beltline" which is the lower edge 12a of the window frame of the side window 12 to be approximately coincident with the axis line Ab oriented from the vanishing point P toward the vehicle interior, it becomes easier for the driver to obtain the "axis feeling", and adequately figure out the position of an own vehicle in a space where the vehicle travels.

The instrument panel (dashboard) 2 is maximally raised in a region formed as the instrument cluster hood 14. The instrument cluster hood 14 is formed such that the curvature radius thereof is reduced at a vehicle width-directional mid top thereof, to form a protrusion 14a protruding upwardly. This protrusion 14a is located on an axis line Ac extending to the driver from the vanishing point defined when the driver visually views forwardly while being seated in the driver seat, to function as a vanishing point mark. In other words, in top view, a straight line connecting the protrusion 14a and a center point 4a of the steering wheel 4 is parallel to a longitudinal (forward-rearward directional) axis of the vehicle, wherein this straight line is approximately coincident with the axis line Ac extending to the driver from the vanishing point defined when the driver visually views forwardly while being seated in the driver seat.

Further, the protrusion 14a of the instrument cluster hood 14 provided at an upper end of the instrument panel 2 is located above an upper end 4b of the steering wheel 4 when viewed from the driver seated in the driver seat. Thus, the protrusion 14a serving as the vanishing point mark always comes into the field-of-view of the driver during driving of the vehicle, so that attention of the driver is strongly directed toward the protrusion 14a.

As above, by forming the protrusion 14a serving as a mark on the instrument cluster hood 14, the visual line of the driver is more likely to be guided to the protrusion 14a. By guiding the visual line of the driver to the protrusion 14a, the driver becomes more likely to strongly direct attention toward the axis line Ac extending from the vanishing point P to the driver, so that it becomes easier for the driver to figure out the position of the own vehicle in a traveling lane.

Here, a visual line of a driver who drives a vehicle while being seated in a driver seat becomes different depending on the height position of the eyes of the driver, as shown in FIG. 3. In this embodiment, the height position of the eyes of a driver is determined on the basis of a driver model using AM50 (which is a human body model made mainly based on average values of adult males including American adult males by 50%; body height: 175 cm, body weight: 78 kg), and each vehicle interior structural component is designed.

As mentioned above, the vehicle interior structure 1 according to the first embodiment is configured such that the lower edge 12a of the window frame of the side window 12 is approximately coincident with the axis line Ab oriented from the vanishing point P toward the vehicle interior, so that the axis line Ab extending from the vanishing point is approximately coincident with the outline of the lower edge 12a of the window frame of the side window 12 as the vehicle interior structural component over a relatively long distance, and thereby it is possible to effectively assist the "axis feeling" of the driver.

In the vehicle interior structure 1 according to the first embodiment, the upper end of the instrument panel 2 is provided with the protrusion 14a serving as the vanishing point mark at a position on the axis line extending to the driver from the vanishing point P defined when the driver visually views forwardly, so that the driver can easily recognize the vanishing point P. Thus, the driver becomes more likely to direct attention toward the axis line Ac extending from the vanishing point P to the driver. This makes it possible for the driver to easily figure out his/her position in the space where the vehicle travels and to easily drive the vehicle to travel along an appropriate zone in a traveling lane.

In the vehicle interior structure 1 according to the first embodiment, the vanishing point mark is composed of the protrusion 14a provided in the instrument panel, so that it impossible to provide the vanishing point mark at a given position without spoiling aesthetic quality of the vehicle interior structure.

In the vehicle interior structure 1 according to the first embodiment, the protrusion 14a provided in the instrument panel 2 is provided in the top of the instrument cluster hood 14, so that the protrusion 14a serving as the mark of the vanishing point P is located at an approximately center of the field-of-view of the driver. Thus, the driver is apt to naturally look at the protrusion 14a, so that it is possible for the driver to effectively direct attention toward the axis line Ac extending from the vanishing point P.

In the vehicle interior structure 1 according to the first embodiment, the protrusion 14a serving as the vanishing point mark is located above the upper end of the steering wheel 4 of the vehicle when viewed from the driver seated in the driver seat of the vehicle, so that it is possible to allow the vanishing point mark to always come into the driver's field-of-view together with an external landscape, thereby always prompting the driver to direct attention toward the vanishing point.

Next, with reference to FIG. 4, a vehicle interior structure according to a second embodiment of the present invention will be described.

Figure 4:
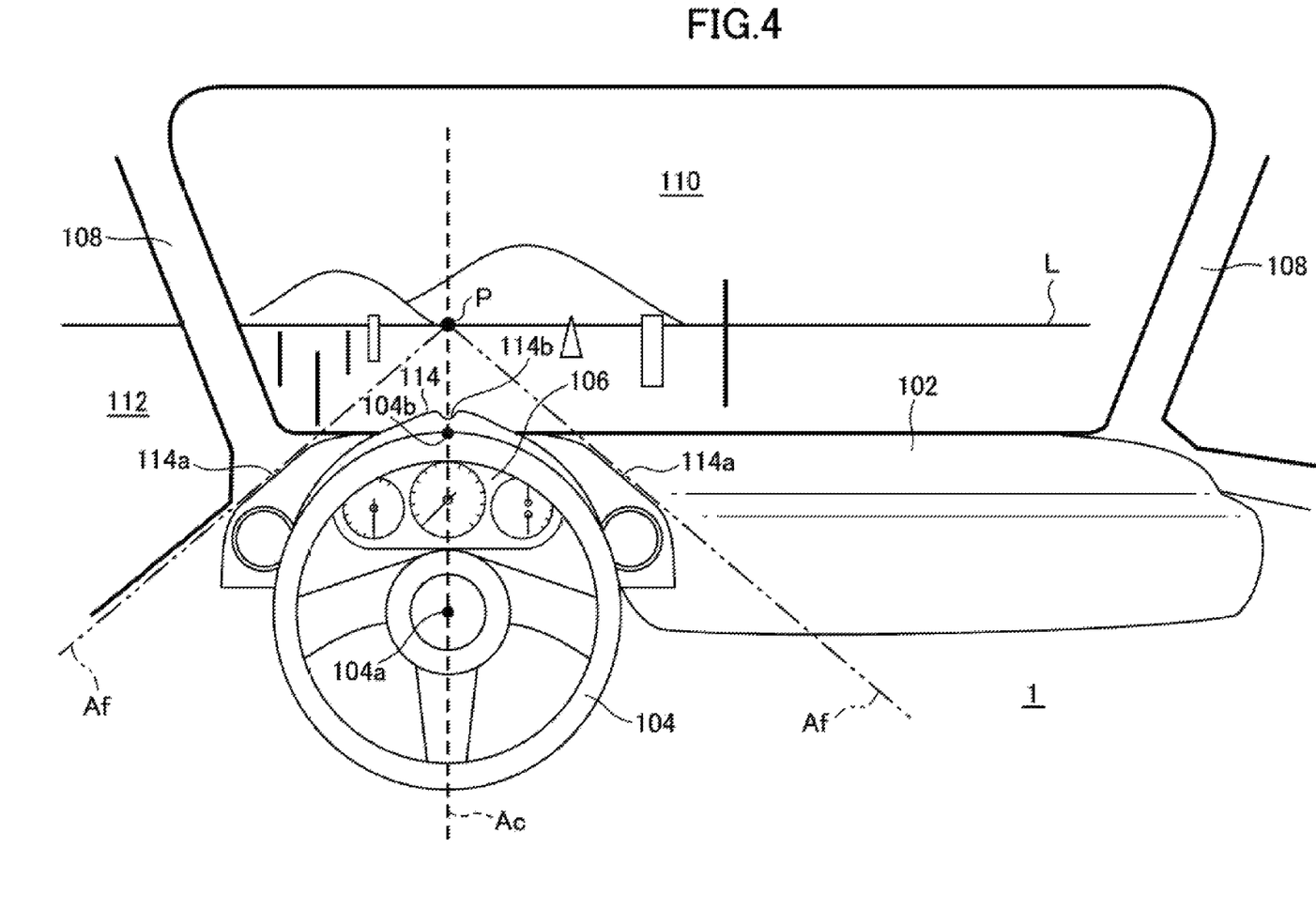
FIG. 4 is a perspective view showing a vehicle interior structure according to a second embodiment of the present invention.

FIG. 4 is a perspective view showing the vehicle interior structure according to the second embodiment.

As shown in FIG. 4, in the vehicle interior structure 100 according to the second embodiment, as the vehicle interior structural component, an instrument panel 102, a steering wheel 104, an instrument cluster 106, a front pillar 108, a front window 110, a side window 112, etc., come into the field-of-view of a driver. Here, a region of the instrument panel 102 located just above the instrument cluster 106 is formed as a raised portion which makes up an instrument cluster hood 114.

In this embodiment, the vehicle interior structure 100 is configured such that two ridge lines on opposite sides of the instrument cluster hood 114 of the instrument panel 102 as the vehicle interior structural component are approximately coincident, respectively, with two axis lines Af each oriented from a vanishing point P toward a vehicle interior. More specifically, the raised portion forming the instrument cluster hood 114 has two inclined surfaces on opposite sides thereof, wherein each of the inclined surfaces is partly formed linearly. Then, an inclination of each of two ridge lines 114a linearly extending in an inverted V shape is approximately coincident with an inclination of a corresponding one of the two axis lines Af oriented from the vanishing point P toward the vehicle interior. As above, by allowing each of the ridge lines 114a of the outline the instrument cluster hood 114 to be approximately coincident with a corresponding one of the two axis lines Af oriented from the vanishing point P toward the vehicle interior, it becomes easier for the driver to obtain the "axis feeling", and adequately figure out the position of an own vehicle in a space where the vehicle travels.

As shown in FIG. 4, the instrument panel (dashboard) 102 is maximally raised in a region formed as the instrument cluster hood 114. The instrument cluster hood 114 is formed with a recess 114 at a vehicle width-directional mid top thereof. This recess 114a is located on an axis line Ac extending to the driver from the vanishing point defined when the driver visually views forwardly while being seated in the driver seat, to function as a vanishing point mark. In other words, in top view, a straight line connecting the recess 114a and a center point 104a of the steering wheel 104 is parallel to a longitudinal axis of the vehicle, wherein this straight line is approximately coincident with the axis line Ac extending to the driver from the vanishing point defined when the driver visually views forwardly.

Further, the mid recess 114a of the instrument cluster hood 114 provided at an upper end of the instrument panel 102 is located above an upper end 104b of the steering wheel 104 when viewed from the driver seated in the driver seat. Thus, the recess 114a serving as the vanishing point mark always comes into the field-of-view of the driver during driving of the vehicle, so that attention of the driver is strongly directed toward the recess 114a.

As above, by forming the recess 114a serving as a mark on the instrument cluster hood 114, the visual line of the driver is more likely to be guided to the recess 114a. By guiding the visual line of the driver to the recess 114a, the driver becomes more likely to strongly direct attention toward the axis line Ac extending from the vanishing point P to the driver, so that it becomes easier for the driver to figure out the position of the own vehicle in a traveling lane.

As with the first embodiment, in the second embodiment, the height position of the eyes of a driver is determined on the basis of a driver model using AM50 as a human body model, and each vehicle interior component is designed.

As mentioned above, the vehicle interior structure 100 according to the second embodiment is configured such that each of the ridge lines 114a as a given region of the outer edge of the instrument cluster hood 114 is approximately coincident with a corresponding one of the axis lines Af oriented from the vanishing point P toward the vehicle interior, so that the "axis feeling" is assisted in the vicinity of the center of the field-of-view of the driver, and thereby it is possible to effectively assist the "axis feeling" of the driver.

In the vehicle interior structure 100 according to the second embodiment, the upper end of the instrument panel 102 is provided with the recess 114a serving as the vanishing point mark at a position on the axis line extending to the driver from the vanishing point P defined when the driver visually views forwardly, so that the driver can easily recognize the vanishing point P.

Next, with reference to FIG. 5, a vehicle interior structure according to a third embodiment of the present invention will be described.

FIG. 6 is a perspective view showing the vehicle interior structure according to the third embodiment.

Figure 5:
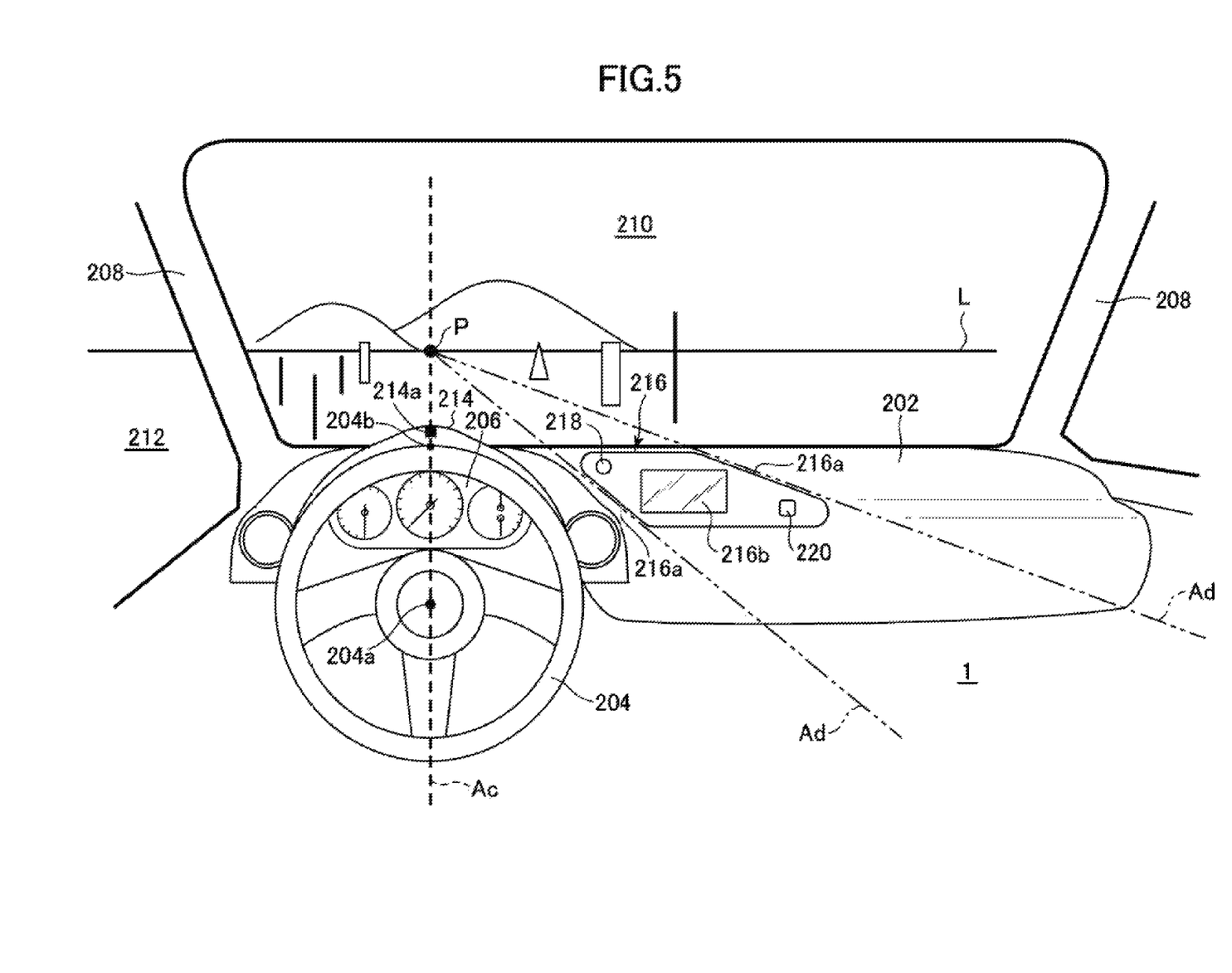
FIG. 5 is a perspective view showing a vehicle interior structure according to a third embodiment of the present invention.

As shown in FIG. 5, in the vehicle interior structure 200 according to the third embodiment, as the vehicle interior structural component, an instrument panel 202, a steering wheel 204, an instrument cluster 206, a front pillar 208, a front window 210, a side window 212, a center display 216, etc., come into the field-of-view of a driver. Here, a region of the instrument panel 202 located just above the instrument cluster 206 is formed as a raised portion which makes up an instrument cluster hood 214.

As shown in FIG. 5, the center display 216 serving as the vehicle interior structural component is a display device arranged on the instrument panel 202 at a vehicle width-directional central position to display information about the vehicle, map information, traffic information and others. In the third embodiment, a body of the center display 216 is formed in a trapezoidal shape, wherein opposite lateral edges 216a thereof are inclined to face toward the side of a driver seat.

That is, the body of the center display 216 is formed in a trapezoidal shape having upper and bottom sides parallel to each other, and two lateral sides inclined in the same direction, wherein the two lateral sides form the opposite lateral edges 216a. Further, in the two lateral sides, one inner side closer to the driver seat has a steeper inclination, and another outer side (farther from the driver seat) has a moderate inclination as compared with the inner side. In this way, each of the lateral edges 216a of the center display 216 is oriented such that it is coincident with a corresponding one of two axis lines Ad oriented from a vanishing point P toward a vehicle interior.

As above, by allowing each of the lateral edges 216a of the center display 216 to be approximately coincident with a corresponding one of the two axis lines Ad oriented from the vanishing point P toward the vehicle interior, it becomes easier for the driver to obtain the "axis feeling", and adequately figure out the position of an own vehicle in a space where the vehicle travels.

The center display 216 comprises a rectangular liquid crystal display 216b provided in a central region of the body thereof and configured to display a variety of information thereon. The center display 216 also comprises a camera lens 218 provided in a space between the liquid crystal display 216b and the edge 216a closer to the driver seat to monitor the driver. The center display 216 further comprises an LED (light-emitting diode) provided in a space between the liquid crystal display 216b and the edge 216a farther from the driver seat to illuminate the driver and the vehicle interior. That is, in a front surface of the center display 216, the camera lens 218 is arranged on the upper side of one lateral region thereof closer to the driver seat, and the LED 220 is arranged on the lower side of another lateral region thereof farther from the driver seat.

As shown in FIG. 5, the instrument panel (dashboard) 202 is maximally raised in a region formed as the instrument cluster hood 214. The instrument cluster hood 214 is formed with a marked spot 214 at a vehicle width-directional mid top thereof, wherein the marked spot 214a is formed in a color different from that of the surround. This marked spot 214a is located on an axis line Ac extending to the driver from the vanishing point defined when the driver visually views forwardly while being seated in the driver seat, to function as a vanishing point mark. In other words, in top view, a straight line connecting the marked spot 214a and a center point 204a of the steering wheel 204 is parallel to a longitudinal axis of the vehicle, wherein this straight line is approximately coincident with the axis line Ac extending to the driver from the vanishing point defined when the driver visually views forwardly.

Further, the mid marked spot 214a of the instrument cluster hood 214 provided at an upper end of the instrument panel 202 is located above an upper end 204b of the steering wheel 204 when viewed from the driver seated in the driver seat. Thus, the marked spot 214a serving as the vanishing point mark always comes into the field-of-view of the driver during driving of the vehicle, so that attention of the driver is strongly directed toward the marked spot 214a.

As above, by forming the marked spot 214a serving as a mark on the instrument cluster hood 214, the visual line of the driver is more likely to be guided to the marked spot 214a. By guiding the visual line of the driver to the marked spot 214a, the driver becomes more likely to strongly direct attention toward the axis line Ac extending from the vanishing point P to the driver, so that it becomes easier for the driver to figure out the position of the own vehicle in a traveling lane.

As with the first and second embodiments, in the third embodiment, the height position of the eyes of a driver is determined on the basis of a driver model using AM50 as a human body model, and each vehicle interior component is designed.

As mentioned above, in the vehicle interior structure 200 according to the third embodiment, the upper end of the instrument panel 202 is provided with the marked spot 214a serving as the vanishing point mark at a position on the axis line extending to the driver from the vanishing point P defined when the driver visually views forwardly, so that the driver can easily recognize the vanishing point P.

In the vehicle interior structure 200 according to the third embodiment is configured such that each of the opposite lateral edges 214a of the center display 216 is approximately coincident with a corresponding one of the axis lines Ad oriented from the vanishing point P toward the vehicle interior, so that an outline for assisting the "axis feeling" can be arranged in a vehicle width-directional center side of the vehicle, and thereby it becomes possible for the driver to obtain a more accurate axis feeling.

Although the present invention has been fully described based on some preferred embodiments thereof, it is to be understood that various changes and modifications may be made therein.

LIST OF REFERENCE SIGNS

1: vehicle interior structure
2: instrument panel
4: steering wheel
4a: center point
4b: upper end
6: instrument cluster
8: front pillar
10: front window
12: side window
12a: lower edge of window frame
14: instrument cluster hood
14a: protrusion (vanishing point mark)
100: vehicle interior structure
102: instrument panel
104: steering wheel
104a: center point
104b: upper end
106: instrument cluster
108: front pillar
110: front window
112: side window
114: instrument cluster hood
114a: ridge line
114b: recess (vanishing point mark)
200: vehicle interior structure
202: instrument panel
204: steering wheel
204a: center point
204b: upper edge
206: instrument cluster
208: front pillar
210: front window
212: side window
214: instrument cluster hood
214a: marked spot (vanishing point mark)
216: center display
216a: edge
216b: liquid crystal display
218: camera lens
220: LED

The invention claimed is:

1. An interior structure for a vehicle, comprising:
a vehicle interior structural component arranged within a field-of-view of a driver,
wherein a center point of the steering wheel and a mid-top of an instrument cluster hood arranged within a vehicle interior are located on an axis line extending to the driver from a vanishing point defined when the driver visually views forwardly while being seated in the driver seat, during traveling of the vehicle in a flat and straight lane,
wherein an outline of at least one of a side window, the instrument cluster hood, and a body of the center display arranged on the instrument panel serving as the vehicle interior structural component is coincident with an axis line oriented toward the vehicle interior, among a plurality of axis lines radially extending from a vanishing point,
wherein at least one outline of the vehicle interior structural component is visually viewed such that it is coincident with the axis line oriented from the vanishing point toward the vehicle interior, in a forward field-of-view of the driver seated in the driver seat, and
wherein the vehicle interior structural component includes a center display arranged on an instrument panel of the vehicle, and wherein the interior structure is configured such that each of opposite lateral edges of a body of the center display is approximately coincident with the axis line oriented from the vanishing point toward the vehicle interior.

2. The interior structure according to claim 1, wherein the vehicle interior structural component further includes a window frame of a side window, and wherein the interior structure is configured such that a lower edge of the window frame is approximately coincident with the axis line oriented from the vanishing point toward the vehicle interior.

3. The interior structure according to claim 1, wherein the vehicle interior structural component further includes the instrument cluster hood, and wherein the interior structure is configured such that a given region of an outer edge of the instrument cluster hood is approximately coincident with the axis line oriented from the vanishing point toward the vehicle interior.

4. The interior structure according to claim 1, wherein an upper end of an instrument panel arranged in front of the driver seat to serve as the vehicle interior structural component is provided with a vanishing point mark at a position on the axis line extending to the driver from the vanishing point defined when the driver visually views forwardly while being seated in the driver seat.

5. The interior structure according to claim 4, wherein the vanishing point mark formed on the upper end of the instrument panel is a protrusion formed on the instrument panel.

6. The interior structure according to claim 5, wherein the protrusion formed on the instrument panel is provided at a top of an instrument cluster hood of the instrument panel.

7. The interior structure according to claim 4, wherein the vanishing point mark formed on the upper end of the instrument panel is located above an upper end of a steering wheel of the vehicle when viewed from the driver seated in the driver seat of the vehicle.

8. The interior structure according to claim 4, wherein outlines of both sides of top of the instrument cluster hood are coincident, respectively, with two axis lines oriented toward the vehicle interior, among the axis lines radially extending from the vanishing point defined when the driver visually views forwardly while being seated in the driver seat.

* * * * *